United States Patent
Azmat

(10) Patent No.: US 9,906,924 B2
(45) Date of Patent: Feb. 27, 2018

(54) ESTABLISHING A LOCAL VEHICLE COMMUNICATION GROUP

(71) Applicant: General Motors LLC, Detroit, MI (US)

(72) Inventor: Syed K. Azmat, Windsor (CA)

(73) Assignee: General Motors LLC, Detroit, MI (US)

( * ) Notice: Subject to any disclaimer, the term of this patent is extended or adjusted under 35 U.S.C. 154(b) by 0 days.

(21) Appl. No.: 14/510,239

(22) Filed: Oct. 9, 2014

(65) Prior Publication Data

US 2016/0105775 A1    Apr. 14, 2016

(51) Int. Cl.
| | | |
|---|---|---|
| H04W 4/08 | (2009.01) | |
| H04L 29/08 | (2006.01) | |
| H04W 76/00 | (2018.01) | |
| H04W 88/08 | (2009.01) | |

(52) U.S. Cl.
CPC ............. *H04W 4/08* (2013.01); *H04L 67/12* (2013.01); *H04W 76/002* (2013.01); *H04W 88/08* (2013.01)

(58) Field of Classification Search
CPC ..... H04W 8/005; H04W 40/02; H04W 84/18; H04W 4/08; H04W 76/002; H04W 88/08; H04L 67/12
USPC ............... 455/41.2, 518–519; 709/238, 244
See application file for complete search history.

(56) References Cited

U.S. PATENT DOCUMENTS

| | | | | |
|---|---|---|---|---|
| 7,991,381 B1* | 8/2011 | Dunne | ................ | B60R 25/00 379/33 |
| 8,762,518 B2* | 6/2014 | Chen | ................ | H04L 45/20 709/209 |
| 9,020,687 B2* | 4/2015 | Mendelson | ........... | G08G 1/14 701/31.5 |
| 2005/0152318 A1 | 7/2005 | Elbatt et al. | | |
| 2009/0287499 A1* | 11/2009 | Link, II | ........... | G06Q 30/018 705/317 |
| 2010/0080168 A1* | 4/2010 | Fukuyama | ........ | H04L 45/121 370/328 |
| 2010/0167709 A1* | 7/2010 | Varadarajan | ...... | H04L 67/104 455/414.3 |
| 2013/0281023 A1* | 10/2013 | Madanarajagopal | .... | H04B 7/00 455/41.3 |

(Continued)

OTHER PUBLICATIONS

"Voice over VANETs (VoVAN): QoS Performance Analysis of Different Voice CODECs in Urban VANET Scenarios", Brak et al., Multimedia Computing and Systems, 2012. pp. 360-365.*

*Primary Examiner* — Raymond Dean
(74) *Attorney, Agent, or Firm* — David Willoughby; Reising Ethington P.C.

(57) ABSTRACT

A system and method of wirelessly communicating voice conversations between a plurality of vehicles includes: initiating at a host vehicle a voice communication group that facilitates voice communications between a plurality of vehicles; identifying one or more client vehicles for inclusion with the voice communication group; transmitting a broadcast identifier or a vehicle identifier for the host vehicle and each client vehicle to a vehicle telematics service provider via a wireless carrier system; and communicating voice data between the host vehicle and each client vehicle included in the voice communication group via the wireless carrier system and the vehicle telematics service provider.

16 Claims, 2 Drawing Sheets

(56) References Cited

U.S. PATENT DOCUMENTS

2015/0092652 A1* 4/2015 Ramamurthy ...... H04W 72/005
  370/312
2015/0127840 A1* 5/2015 Snodgrass ......... G06F 17/30861
  709/228

* cited by examiner

ESTABLISHING A LOCAL VEHICLE COMMUNICATION GROUP

TECHNICAL FIELD

The present invention relates to vehicle communications and, more particularly, to wirelessly communicating voice conversations between a plurality of vehicles.

BACKGROUND

Modern vehicles are often equipped with hardware that facilitates wireless communications between the vehicle and other entities located away from the vehicle. For instance, a vehicle occupant can use a vehicle telematics unit to place a telephone call from the vehicle and carry out conversations over that call. To place such a telephone call, the vehicle occupant can use an interface in the vehicle to dial the telephone number and the vehicle telematics unit will then initiate a cellular call through a wireless carrier system. However, the vehicle occupant may not always know the telephone number of an intended recipient. This can be true when someone knows the vehicle occupants located in nearby vehicles but does not know the telephone numbers associated with those vehicles. Without knowing the telephone number of the vehicle telematics unit, it will not be possible to establish a cellular call with that vehicle. Further, the vehicle occupant may wish to speak with people in multiple vehicles, which would involve knowing the telephone numbers for each vehicle. And even if those telephone numbers where known, it may be difficult for a group of people located in different vehicles to communicate with each other when each vehicle uses a different telephone number. It would be helpful to be able to initiate and establish wireless voice communications between a group of vehicles.

SUMMARY

According to an embodiment, there is provided a method of wirelessly communicating voice conversations between a plurality of vehicles. The method includes initiating at a host vehicle a voice communication group that facilitates voice communications between a plurality of vehicles; identifying one or more client vehicles for inclusion with the voice communication group; transmitting a vehicle identifier for the host vehicle and each client vehicle to a vehicle telematics service provider via a wireless carrier system; and communicating voice data between the host vehicle and each client vehicle included in the voice communication group via the wireless carrier system and the vehicle telematics service provider.

According to another embodiment, a method of wirelessly communicating voice conversations between a plurality of vehicles includes receiving broadcast identifiers or vehicle identifiers for a host vehicle and one or more client vehicles at the vehicle telematics service provider; communicating voice data between the host vehicle and each client vehicle included in a voice communication group via the vehicle telematics service provider; detecting at the vehicle telematics service provider that a vehicle has left the voice communication group; and transmitting an instruction to the voice communication group to initiate a short-range wireless link with the vehicle that left the voice communication group.

BRIEF DESCRIPTION OF THE DRAWINGS

One or more embodiments of the invention will hereinafter be described in conjunction with the appended drawings, wherein like designations denote like elements, and wherein.

DETAILED DESCRIPTION OF THE ILLUSTRATED EMBODIMENTS

The system and method described below establishes wireless voice communications between a group of vehicles through a vehicle telematics service provider. A person in a vehicle may want to talk with people in other vehicles and to do so can initiate a voice communication group comprising a plurality of vehicles that each receive voice conversations via microphones and share those utterances with the other vehicles in the group through the vehicle telematics subscriber service. The voice communication group can be initiated or established at a vehicle by a vehicle occupant who informs the vehicle that a group is desired and identifies the other vehicles to be included in the group. For explanation purposes, the vehicle initiating or establishing the voice communication group and receiving vehicle identities from a vehicle occupant can be referred to as a host vehicle while each vehicle identified by the vehicle occupant can be referred to as client vehicles. However, it should be appreciated that any vehicle in the voice communication group can act as a host vehicle.

Vehicles can include a short-range wireless antenna and serve as a wireless access point (WAP). The WAP can broadcast the identity of the vehicle locally via a short-range wireless signal. The host vehicle can detect the broadcast identifiers of the WAPs via their short-range wireless signals and present the broadcast identifiers to a vehicle occupant. The broadcast identifiers can be presented to a vehicle occupant who then chooses from those names to select the vehicles that will be included in the vehicle communication group. After the vehicle occupant identifies the vehicles to be included in the voice communication group, the host vehicle can transmit the identities of all vehicles in the voice communication group to the vehicle telematics subscription service. The vehicle telematics subscription service can then initiate contact with all of the vehicles in the voice communication group.

Communications System—

Figure 1:
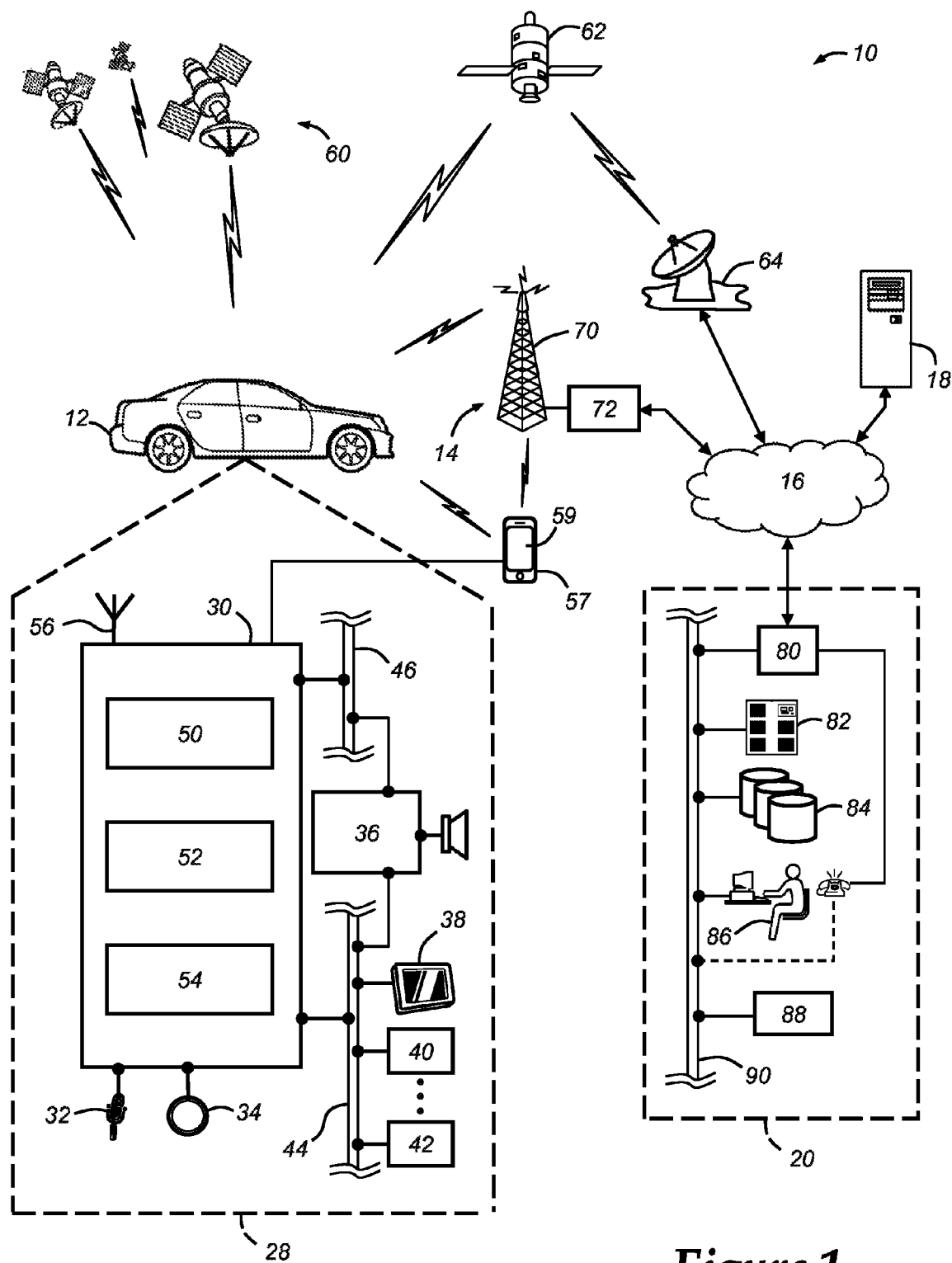
FIG. 1 is a block diagram depicting an embodiment of a communications system that is capable of utilizing the method disclosed herein.

With reference to FIG. 1, there is shown an operating environment that comprises a mobile vehicle communications system 10 and that can be used to implement the method disclosed herein. Communications system 10 generally includes a vehicle 12, one or more wireless carrier systems 14, a land communications network 16, a computer 18, and a call center 20. It should be understood that the disclosed method can be used with any number of different systems and is not specifically limited to the operating environment shown here. Also, the architecture, construction, setup, and operation of the system 10 and its individual components are generally known in the art. Thus, the following paragraphs simply provide a brief overview of one such communications system 10; however, other systems not shown here could employ the disclosed method as well.

Vehicle 12 is depicted in the illustrated embodiment as a passenger car, but it should be appreciated that any other vehicle including motorcycles, trucks, sports utility vehicles (SUVs), recreational vehicles (RVs), marine vessels, aircraft, etc., can also be used. Some of the vehicle electronics 28 is shown generally in FIG. 1 and includes a telematics unit 30, a microphone 32, one or more pushbuttons or other control inputs 34, an audio system 36, a visual display 38, and a GPS module 40 as well as a number of vehicle system modules (VSMs) 42. Some of these devices can be connected directly to the telematics unit such as, for example, the microphone 32 and pushbutton(s) 34, whereas others are indirectly connected using one or more network connections, such as a communications bus 44 or an entertainment bus 46. Examples of suitable network connections include a controller area network (CAN), a media oriented system transfer (MOST), a local interconnection network (LIN), a local area network (LAN), and other appropriate connections such as Ethernet or others that conform with known ISO, SAE and IEEE standards and specifications, to name but a few.

Telematics unit 30 can be an OEM-installed (embedded) or aftermarket device that is installed in the vehicle and that enables wireless voice and/or data communication over wireless carrier system 14 and via wireless networking. This enables the vehicle to communicate with call center 20, other telematics-enabled vehicles, or some other entity or device. The telematics unit preferably uses radio transmissions to establish a communications channel (a voice channel and/or a data channel) with wireless carrier system 14 so that voice and/or data transmissions can be sent and received over the channel. By providing both voice and data communication, telematics unit 30 enables the vehicle to offer a number of different services including those related to navigation, telephony, emergency assistance, diagnostics, infotainment, etc. Data can be sent either via a data connection, such as via packet data transmission over a data channel, or via a voice channel using techniques known in the art. For combined services that involve both voice communication (e.g., with a live advisor or voice response unit at the call center 20) and data communication (e.g., to provide GPS location data or vehicle diagnostic data to the call center 20), the system can utilize a single call over a voice channel and switch as needed between voice and data transmission over the voice channel, and this can be done using techniques known to those skilled in the art.

According to one embodiment, telematics unit 30 utilizes cellular communication according to either GSM or CDMA standards and thus includes a standard cellular chipset 50 for voice communications like hands-free calling, a wireless modem for data transmission, an electronic processing device 52, one or more digital memory devices 54, and a dual antenna 56. It should be appreciated that the modem can either be implemented through software that is stored in the telematics unit and is executed by processor 52, or it can be a separate hardware component located internal or external to telematics unit 30. The modem can operate using any number of different standards or protocols such as EVDO, CDMA, GPRS, and EDGE, Wireless networking between the vehicle and other networked devices can also be carried out using telematics unit 30. For this purpose, telematics unit 30 can be configured to communicate wirelessly according to one or more short-range wireless protocols, such as any of the IEEE 802.11 protocols, WiMAX, or Bluetooth. When used for packet-switched data communication such as TCP/IP, the telematics unit can be configured with a static IP address or can set up to automatically receive an assigned IP address from another device on the network such as a router or from a network address server. The wireless protocols can be used to carry out or implement wireless access points (WAPs) at the vehicle 12. As part of providing a WAP, the vehicle 12 can generate a broadcast identifier, such as a network name, that can be used by other wireless devices using short-range wireless protocols to identify the WAP and/or the vehicle 12 operating the WAP.

One of the networked devices that can communicate with the telematics unit 30 is a handheld wireless device, such as a smart phone 57. The smart phone 57 can include computer processing capability, a transceiver capable of communicating using a short-range wireless protocol, and a visual smart phone display 59, in some implementations, the smart phone display 59 also includes a touch-screen graphical user interface and/or a GPS module capable of receiving GPS satellite signals and generating GPS coordinates based on those signals. Examples of the smart phone 57 include the iPhone™ manufactured by Apple, Inc. and the Droid™ manufactured by Motorola, Inc. but others are known. These and other similar devices may be used or considered as a type of separate wireless device for the purposes of the method described herein. While the smart phone 57 is described with the methods below, it should be appreciated that other similar and/or simpler handheld wireless device can be successfully substituted for the smart phone 57 to carry out the method/system described herein. For instance, devices such as the iPad™ or iPod Touch™ can also use the short-range wireless protocols to communicate despite not having the capability to communicate via cellular protocols.

Processor 52 can be any type of device capable of processing electronic instructions including microprocessors, microcontrollers, host processors, controllers, vehicle communication processors, and application specific integrated circuits (ASICs). It can be a dedicated processor used only for telematics unit 30 or can be shared with other vehicle systems. Processor 52 executes various types of digitally-stored instructions, such as software or firmware programs stored in memory 54, which enable the telematics unit to provide a wide variety of services. For instance, processor 52 can execute programs or process data to carry out at least a part of the method discussed herein.

Telematics unit 30 can be used to provide a diverse range of vehicle services that involve wireless communication to and/or from the vehicle. Such services include: turn-by-turn directions and other navigation-related services that are provided in conjunction with the GPS-based vehicle navigation module 40; airbag deployment notification and other emergency or roadside assistance-related services that are provided in connection with one or more collision sensor interface modules such as a body control module (not shown); diagnostic reporting using one or more diagnostic modules; and infotainment-related services where music, webpages, movies, television programs, videogames and/or other information is downloaded by an infotainment module (not shown) and is stored for current or later playback. The above-listed services are by no means an exhaustive list of all of the capabilities of telematics unit 30, but are simply an enumeration of some of the services that the telematics unit is capable of offering. Furthermore, it should be understood that at least some of the aforementioned modules could be implemented in the form of software instructions saved internal or external to telematics unit 30, they could be hardware components located internal or external to telematics unit 30, or they could be integrated and/or shared with each other or with other systems located throughout the vehicle, to cite but a few possibilities. In the event that the modules are implemented as VSMs 42 located external to telematics unit 30, they could utilize vehicle bus 44 to exchange data and commands with the telematics unit.

GPS module 40 receives radio signals from a constellation 60 of GPS satellites. From these signals, the module 40 can determine vehicle position that is used for providing navigation and other position-related services to the vehicle driver. Navigation information can be presented on the display 38 (or other display within the vehicle) or can be presented verbally such as is done when supplying turn-by-turn navigation. The navigation services can be provided using a dedicated in-vehicle navigation module (which can be part of GPS module 40), or some or all navigation services can be done via telematics unit 30, wherein the position information is sent to a remote location for purposes of providing the vehicle with navigation maps, map annotations (points of interest, restaurants, etc.), route calculations, and the like. The position information can be supplied to call center 20 or other remote computer system, such as computer 18, for other purposes, such as fleet management. Also, new or updated map data can be downloaded to the GPS module 40 from the call center 20 via the telematics unit 30.

Apart from the audio system 36 and GPS module 40, the vehicle 12 can include other vehicle system modules (VSMs) 42 in the form of electronic hardware components that are located throughout the vehicle and typically receive input from one or more sensors and use the sensed input to perform diagnostic, monitoring, control, reporting and/or other functions. Each of the VSMs 42 is preferably connected by communications bus 44 to the other VSMs, as well as to the telematics unit 30, and can be programmed to run vehicle system and subsystem diagnostic tests. As examples, one VSM 42 can be an engine control module (ECM) that controls various aspects of engine operation such as fuel ignition and ignition timing, another VSM 42 can be a powertrain control module that regulates operation of one or more components of the vehicle powertrain, and another VSM 42 can be a body control module that governs various electrical components located throughout the vehicle, like the vehicle's power door locks and headlights. According to one embodiment, the engine control module is equipped with on-board diagnostic (OBD) features that provide myriad real-time data, such as that received from various sensors including vehicle emissions sensors, and provide a standardized series of diagnostic trouble codes (DTCs) that allow a technician to rapidly identify and remedy malfunctions within the vehicle. As is appreciated by those skilled in the art, the above-mentioned VSMs are only examples of some of the modules that may be used in vehicle 12, as numerous others are also possible.

Vehicle electronics 28 also includes a number of vehicle user interfaces that provide vehicle occupants with a means of providing and/or receiving information, including microphone 32, pushbuttons(s) 34, audio system 36, and visual display 38. As used herein, the term 'vehicle user interface' broadly includes any suitable form of electronic device, including both hardware and software components, which is located on the vehicle and enables a vehicle user to communicate with or through a component of the vehicle. Microphone 32 provides audio input to the telematics unit to enable the driver or other occupant to provide voice commands and carry out hands-free calling via the wireless carrier system 14. For this purpose, it can be connected to an on-board automated voice processing unit utilizing human-machine interface (HMI) technology known in the art. The pushbutton(s) 34 allow manual user input into the telematics unit 30 to initiate wireless telephone calls and provide other data, response, or control input. Separate pushbuttons can be used for initiating emergency calls versus regular service assistance calls to the call center 20. Audio system 36 provides audio output to a vehicle occupant and can be a dedicated, stand-alone system or part of the primary vehicle audio system. According to the particular embodiment shown here, audio system 36 is operatively coupled to both vehicle bus 44 and entertainment bus 46 and can provide AM, FM and satellite radio, CD, DVD and other multimedia functionality. This functionality can be provided in conjunction with or independent of the infotainment module described above. Visual display 38 is preferably a graphics display, such as a touch screen on the instrument panel or a heads-up display reflected off of the windshield, and can be used to provide a multitude of input and output functions. Various other vehicle user interfaces can also be utilized, as the interfaces of FIG. 1 are only an example of one particular implementation.

Wireless carrier system 14 is preferably a cellular telephone system that includes a plurality of cell towers 70 (only one shown), one or more mobile switching centers (MSCs) 72, as well as any other networking components required to connect wireless carrier system 14 with land network 16. Each cell tower 70 includes sending and receiving antennas and a base station, with the base stations from different cell towers being connected to the MSC 72 either directly or via intermediary equipment such as a base station controller. Cellular system 14 can implement any suitable communications technology, including for example, analog technologies such as AMPS, or the newer digital technologies such as CDMA (e.g., CDMA2000; 1×EV-DO), GSM/GPRS, HSPA+, or 4G LTE. As will be appreciated by those skilled in the art, various cell tower/base station/MSC arrangements are possible and could be used with wireless system 14. For instance, the base station and cell tower could be co-located at the same site or they could be remotely located from one another, each base station could be responsible for a single cell tower or a single base station could service various cell towers, and various base stations could be coupled to a single MSC, to name but a few of the possible arrangements.

Apart from using wireless carrier system 14, a different wireless carrier system in the form of satellite communication can be used to provide unidirectional or bi-directional communication with the vehicle. This can be done using one or more communication satellites 62 and an uplink transmitting station 64. Uni-directional communication can be, for example, satellite radio services, wherein programming content (news, music, etc.) is received by transmitting station 64, packaged for upload, and then sent to the satellite 62, which broadcasts the programming to subscribers. Bi-directional communication can be, for example, satellite telephony services using satellite 62 to relay telephone communications between the vehicle 12 and station 64. If used, this satellite telephony can be utilized either in addition to or in lieu of wireless carrier system 14.

Land network 16 may be a conventional land-based telecommunications network that is connected to one or more landline telephones and connects wireless carrier system 14 to call center 20. For example, land network 16 may include a public switched telephone network (PSTN) such as that used to provide hardwired telephony, packet switched data communications, and the Internet infrastructure. One or more segments of land network 16 could be implemented through the use of a standard wired network, a fiber or other optical network, a cable network, power lines, other wireless networks such as wireless local area networks (WLANs), or networks providing broadband wireless access (WA), or any combination thereof. Furthermore, call center 20 need not be connected via land network 116, but could include wireless telephony equipment so that it can communicate directly with a wireless network, such as wireless carrier system 14.

Computer 18 can be one of a number of computers accessible via a private or public network such as the Internet. Each such computer 18 can be used for one or more purposes, such as a web server accessible by the vehicle via telematics unit 30 and wireless carrier 14. Other such accessible computers 18 can be, for example: a service center computer where diagnostic information and other vehicle data can be uploaded from the vehicle via the telematics unit 30; a client computer used by the vehicle owner or other subscriber for such purposes as accessing or receiving vehicle data or to setting up or configuring subscriber preferences or controlling vehicle functions; or a third party repository to or from which vehicle data or other information is provided, whether by communicating with the vehicle 12 or call center 20, or both. A computer 18 can also be used for providing Internet connectivity such as DNS services or as a network address server that uses DHCP or other suitable protocol to assign an IP address to the vehicle 12.

Call center 20 is designed to provide the vehicle electronics 28 with a number of different system back-end functions and, according to the exemplary embodiment shown here, generally includes one or more switches 80, servers 82, databases 84, live advisors 86, as well as an automated voice response system (VRS) 88, all of which are known in the art. These various call center components are preferably coupled to one another via a wired or wireless local area network 90. Switch 80, which can be a private branch exchange (PBX) switch, routes incoming signals so that voice transmissions are usually sent to either the live adviser 86 by regular phone or to the automated voice response system 88 using VoIP. The live advisor phone can also use VoIP as indicated by the broken line in FIG. 1. VoIP and other data communication through the switch 80 is implemented via a modem (not shown) connected between the switch 80 and network 90. Data transmissions are passed via the modem to server 82 and/or database 84. Database 84 can store account information such as subscriber authentication information, vehicle identifiers, profile records, behavioral patterns, and other pertinent subscriber information. Data transmissions may also be conducted by wireless systems, such as 802.11x, GPRS, and the like, Although the illustrated embodiment has been described as it would be used in conjunction with a manned call center 20 using live advisor 86, it will be appreciated that the call center can instead utilize VRS 88 as an automated advisor or, a combination of VRS 88 and the live advisor 86 can be used.

Figure 2:
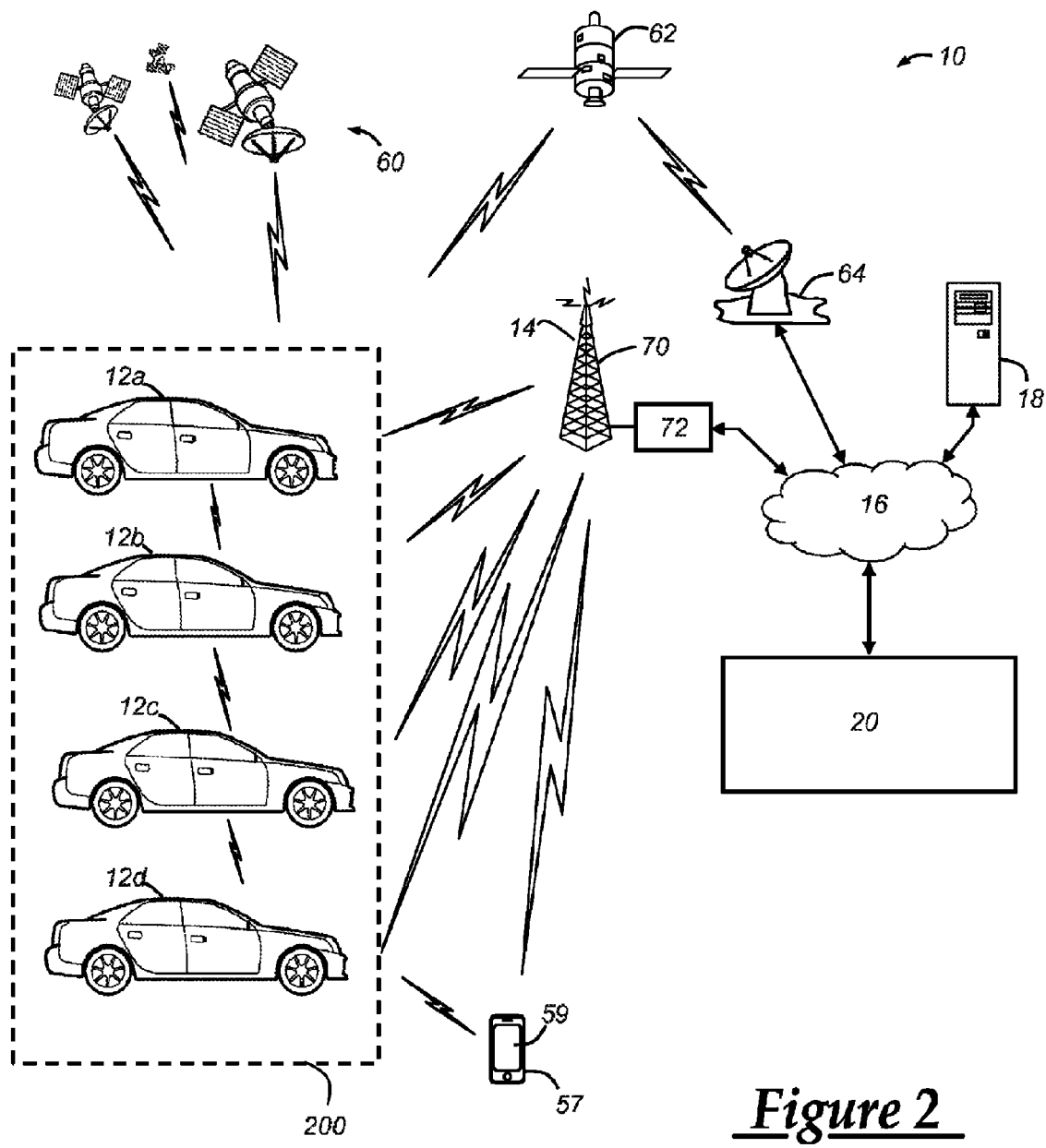
FIG. 2 is a block diagram depicting another embodiment of a communications system that is capable of utilizing the method disclosed herein.

A portion of the operating environment and mobile vehicle communications system 10 discussed above with respect to FIG. 1 is shown in FIG. 2 with a plurality of vehicles 12a-12d that are able to be included in a voice communication group 200. A vehicle occupant riding in a host vehicle 12a can identify other vehicles (12b-12d; also referred to as client vehicles) to be included in the voice communication group 200. While the operating environment 10 is shown with four vehicles, it should be understood that the voice communication group 200 can comprise other quantities of vehicles that are greater than one. The voice communication group 200 can facilitate voice communications between the occupants of the plurality of vehicles 12a-12d by sharing the voice communications or conversations in one of the vehicles with all of the other vehicles in the group. Once the vehicles 12a-12d are included in the voice communication group 200, the voice conversations carried on in one of those vehicles is shared with the other vehicles in the group. As noted above, the host vehicle 12a need not be any different than the other vehicles, but may be referred to as the "host" vehicle merely because it is the one being used to set up the group call.

The voice communication group 200 can be initiated by a vehicle occupant so that the host vehicle 12a knows that a vehicle occupant wants to establish a group 200. This initiation can be received at the host vehicle 12a in the form of a button press, a voice command, or other similar mechanism. The vehicle occupant can then identify one or more client vehicles for inclusion in the group 200. The vehicle occupant can be located in the host vehicle 12a and begin identifying vehicles to be included in the voice communication group 200. In the embodiment shown in FIG. 2, the vehicle occupant may include client vehicles 12b-12d along with his or her own vehicle 12a in the vehicle communication group 200. The host vehicle 12a can then scan the area for the presence of one or more short-range wireless communications signals. In one implementation, the short-range wireless communication signals can be wireless access points (WAPs) that generate a broadcast identifier that differentiates one WAP from another. With respect to vehicles that operate WAPs, the broadcast identifier can not only identify the WAP from other WAPs but it can also be used to identify a vehicle. The broadcast identifier can be customized or personalized by a vehicle owner so the WAP of a particular vehicle can be identified. For instance, a vehicle belonging to "Fred Smith" can generate a broadcast identifier of "Fred Smith's Vehicle" that, when detected by the host vehicle 12a, can be shown to an occupant in the host vehicle 12a on the visual display 38. If the vehicle occupant knows "Fred Smith," the vehicle occupant can recognize Fred Smith's vehicle based on its broadcast identifier. Broadcast identifiers for a plurality of vehicles broadcasting a short-range wireless signal can be detected by the host vehicle 12a and shown to the occupant of the host vehicle 12a.

The occupant can visually scan the list of broadcast identifiers and select the identifiers that represent the vehicles to be included with the voice communication group 200. For instance, the occupant of the host vehicle 12a can be presented with a list of broadcast identifiers via the visual display 38 and select the broadcast identifiers generated by client vehicles 12b-12d that the vehicle occupant wants to share conversations with. The host vehicle 12a can then wirelessly transmit the broadcast identifiers of the client vehicles 12b-12d selected by the vehicle occupant as well as an identifier of the host vehicle 12a to a central facility of a vehicle telematics service provider, such as the computer 18 or the call center 20. The broadcast identifiers can then be used to contact the vehicles 12a-12d. In addition, the broadcast identifiers of the vehicles 12a-12d included in the voice communication group 200 can be shared with each vehicle in the group 200. After the broadcast identifiers are selected, the host vehicle 12a can wirelessly transmit an alert indicating that the selection occurred to the client vehicles 12b-12d identified. The client vehicles 12b-12d receiving the alert can ask a vehicle occupant to confirm that they want to be added to the voice communication group 200. The alert can cause the vehicles 12b-12d to offer the confirmation to the vehicle occupants via the display 38 or via audible prompts played through the audio system 36.

The central facility can then act as portal through which communications between the host vehicle 12a and the client vehicles 12*b*-12*d* pass. Using the broadcast identifiers chosen by the host vehicle 12*a*, the central facility can establish communication links with the each of the vehicles 12*a*-12*d* included in the voice communication group 200. And the central facility can create the communication links in various ways. In one implementation, when the host vehicle 12*a* presents a list of broadcast identifiers via the visual display 38 and a vehicle occupant selects the broadcast identifiers generated by client vehicles 12*b*-12*d* that the vehicle occupant wants to share conversations with, the selection of those identifiers can initiate a request for a vehicle identifier from the selected vehicle (12*b*-12*d*) via a short-range wireless communication link. The vehicle identifier can be used to set up a communication link between the selected vehicle and the central facility and can include a mobile identification number (MIN), a mobile dialed number (MDN), or other similar mechanism used to wirelessly contact the vehicle telematics unit 30. In this implementation, the vehicle generating the broadcast identifier that has been selected can also have the option of refusing the request to send its vehicle identifier and as a result have the ability to establish a privacy mode excluding the vehicle from joining voice communication groups 200. When the host vehicle 12*a* receives the vehicle identifier(s) from the selected vehicle(s) (12*b*-12*d*), the host vehicle 12*a* can then transmit the vehicle identifier(s) to the central facility. The central facility can then call each vehicle in the voice communication group 200 using its vehicle identifier and establish a communication link with that vehicle.

It is possible to establish communication links between the central facility and the vehicles in the voice communication group 200 in other ways. For instance, the central facility can receive the selected broadcast identifiers that are sent from the host vehicle 12*a* and use those identifiers to determine a vehicle identifier associated with each vehicle. Using an example of a broadcast identifier discussed above, if the host vehicle 12*a* selected "Fred Smith's Vehicle" broadcast by client vehicle 12*b* for inclusion in the voice communication group 200, the host vehicle 12*a* could wirelessly transmit an MDN that can be used to contact the host vehicle 12*a* as well as the broadcast identifier "Fred Smith's Vehicle" to the central facility. The central facility can maintain a database that associates the broadcast identifier of the client vehicle 12*b* (or any other vehicle 12) with a vehicle identifier, such as an MDN. Once the central facility has the MDN for both the host vehicle 12*a* and a client vehicle 12*b* that will also be included in the voice communication group 200, the central facility can establish a communication link with both vehicles 12*a* and 12*b*. This process can be applied to additional vehicles, such as client vehicles 12*c*-12*d* until all of the vehicles 12*a*-12*d* intended for inclusion in the voice communication group 200 have been contacted by the central facility and a communication link, such as a telephone call, between the vehicles 12*a*-12*d* and the central facility have been established.

Once all of the vehicles to be included in the voice communication group 200 are communicatively linked to the central facility, the occupants of each vehicle 12*a*-12*d* can speak into the microphone 32 of each vehicle and the vehicle telematics unit 30 can then wirelessly transmit the voice communications from each vehicle 12*a*-12*d* to the central facility. The central facility can then share voice communications from each vehicle 12*a*-12*d* in the voice communication group 200 with the other vehicles in the group 200 using the established communication links. The vehicles 12*a*-12*d* can then receive the shared voice communications and generate the audible representations of the conversations carried out in each vehicle 12*a*-12*d* using the audio system 36 in each vehicle.

As the vehicles 12*a*-12*d* travel, it is possible that one or more of the vehicles included in the voice communication group 200 may no longer be able to support a wireless link with the central facility. When a vehicle in the group 200 loses its wireless connection with the central facility, it can maintain voice communications with the group 200 by establishing a short-range wireless link with another vehicle in the group 200. In one example of this, the voice communication group 200 may include four vehicles 12*a*-12*d*. If the vehicle 12*d* determined that it was unable to maintain a wireless connection with the central facility, the vehicle 12*d* could begin searching for broadcast identifiers generated by nearby vehicles. By knowing the broadcast identifiers of the other vehicles 12*a*-12*c* in the vehicle communication group 200, the vehicle 12*d* can compare the broadcast identifier it detects from nearby vehicles with those of the vehicles in the vehicle communication group 200. When a match is found, the vehicle 12*d* can establish a short-range wireless communication link with another vehicle in the vehicle communication group (e.g., vehicle 12*c*) and then wirelessly transmit and receive voice communications of the vehicle communication group 200 via the short-range wireless link.

The central facility can also detect when a wireless link with one of the vehicles 12*a*-12*d* in the vehicle communication group 200 has been lost. When one or more of the wireless links is broken or lost, the central facility can send a computer-readable instruction to at least one vehicle in the vehicle communication group 200 that the central facility still has a communication link with. The instruction can direct the vehicle still communicating with the central facility to attempt a short-range wireless link with the vehicle in the group 200 that the central facility is unable to contact. When the short-range wireless link is established between two vehicles in the vehicle communication group 200, voice communications can then be provided via the short-range wireless link.

Conversations communicated between the voice communication group 200 can also be provided to a vehicle occupant who leaves a vehicle 12*a*-12*d* belonging to the group 200. For instance, the vehicle occupant may stop the vehicle and leave its cabin such that the vehicle occupant can no longer participate in the conversations carried on by the group via the microphone 32 and the audio system 36 of one of the vehicles 12*a*-12*d*. After a voice communication group 200 is established, the smart phone 57 can be used to send and receive voice communications with other vehicles in the group 200 when a vehicle occupant is away from one of the vehicles 12*a*-12*d*. The vehicle occupant can alert the vehicle that communications with the voice communication group 200 should begin or stop being transmitted to the smart phone 57 via a press of the button 34 or some other input in the vehicle.

In one implementation, the smart phone 57 can be paired with one or more of the vehicles 12*a*-12*d* included in the voice communication group 200 using a short-range wireless link. For example, if the voice communication group 200 included the vehicles 12*a*-12*d* and a vehicle occupant in vehicle 12*d* wants to participate in the conversation of the voice communication group 200 while away from the vehicle 12*d*, the vehicle occupant can direct vehicle 12*d* to transmit communications sent and received between vehicle 12*d* and the central facility to the smart phone 57, which can be carried by the vehicle occupant while away from the vehicle 12*d*. A short-range wireless link can be established between the vehicle 12*d* and the smart phone 57 and while the vehicle occupant is away from vehicle 12d, the voice utterances or conversations carried on in vehicles 12a-12c can then be passed to the smart phone 57 over the short range wireless link. The vehicle occupant carrying the smart phone 57 while away from the vehicle 12d can then speak into the microphone of the smart phone 57 and communicate that speech to vehicles 12a-12c.

It is to be understood that the foregoing is a description of one or more embodiments of the invention. The invention is not limited to the particular embodiment(s) disclosed herein, but rather is defined solely by the claims below. Furthermore, the statements contained in the foregoing description relate to particular embodiments and are not to be construed as limitations on the scope of the invention or on the definition of terms used in the claims, except where a term or phrase is expressly defined above. Various other embodiments and various changes and modifications to the disclosed embodiment(s) will become apparent to those skilled in the art. All such other embodiments, changes, and modifications are intended to come within the scope of the appended claims.

As used in this specification and claims, the terms "e.g.," "for example," "for instance," "such as," and "like," and the verbs "comprising," "having," "including," and their other verb forms, when used in conjunction with a listing of one or more components or other items, are each to be construed as open-ended, meaning that the listing is not to be considered as excluding other, additional components or items. Other terms are to be construed using their broadest reasonable meaning unless they are used in a context that requires a different interpretation.

The invention claimed is:

1. A method of wirelessly communicating voice conversations between a plurality of vehicles, comprising the steps of:
   (a) initiating at a host vehicle a voice communication group that facilitates voice communications between a plurality of vehicles;
   (b) identifying one or more client vehicles for inclusion with the voice communication group in response to step (a);
   (c) transmitting a broadcast identifier or a vehicle identifier for the host vehicle and each client vehicle to a central facility of a vehicle telematics service provider via a wireless carrier system
   (d) establishing communication links between vehicles in the voice communication group and the central facility of the vehicle telematics service provider; and
   (e) communicating voice data between the host vehicle and each client vehicle included in the voice communication group via the wireless carrier system and the central facility of the vehicle telematics service provider.

2. The method of claim 1, further comprising the step of establishing the voice communication group by contacting the client vehicles from the central facility of the vehicle telematics service provider.

3. The method of claim 1, further comprising the step of detecting the identity of one or more client vehicles from a short-range wireless signal broadcast from the client vehicles.

4. The method of claim 1, wherein the voice communication group is initiated via a button press inside the host vehicle.

5. The method of claim 1, further comprising the step of identifying the client vehicles based on broadcast identifiers.

6. The method of claim 5, wherein the broadcast identifiers are generated by wireless access points (WAP).

7. The method of claim 1, further comprising the step of receiving a computer-readable instruction from the central facility of the vehicle telematics service provider instructing a vehicle in the voice communication group to establish a short-range wireless link with another vehicle in the voice communication group that has lost a wireless link with the central facility of the vehicle telematics service provider.

8. The method of claim 1, further comprising the step of matching the broadcast identifier with a vehicle identifier at the central facility of the vehicle telematics service provider.

9. The method of claim 1, further comprising the step of communicating voice data between a handheld wireless device and the voice communication group via a short-range wireless link with one of the vehicles in the voice communication group.

10. A method of wirelessly communicating voice conversations between a plurality of vehicles, comprising the steps of:
    (a) receiving a broadcast identifier or vehicle identifiers for a host vehicle and one or more client vehicles at a central facility of a vehicle telematics service provider
    (b) establishing communication links between the vehicles in a voice communication group and the central facility of the vehicle telematics service provider;
    (c) communicating voice data between the host vehicle and each client vehicle included in the voice communication group via the central facility of the vehicle telematics service provider;
    (d) detecting at the central facility of the vehicle telematics service provider that a vehicle has left the voice communication group; and
    (e) transmitting an instruction to the voice communication group to initiate a short-range wireless link with the vehicle that left the voice communication group.

11. The method of claim 10, further comprising the steps of:
    (f) linking a handheld wireless device with a host vehicle or a client vehicle via a short-range wireless link;
    (g) communicating voice data between the handheld wireless device and the voice communication group via the short-range wireless link, the central facility of the vehicle telematics service provider, and the wireless carrier system.

12. The method of claim 10, further comprising the step of detecting the identity of one or more client vehicles from a short-range wireless signal broadcast from the client vehicles.

13. The method of claim 10, wherein the voice communication group is initiated via a button press inside the host vehicle.

14. The method of claim 10, further comprising the step of identifying the host vehicle and client vehicles based on broadcast identifiers.

15. The method of claim 14, wherein the broadcast identifiers are generated by a wireless access point (WAP).

16. The method of claim 10, further comprising the step of matching the broadcast identifier with a vehicle identifier at the central facility of the vehicle telematics service provider.

* * * * *